US 9,564,664 B2

(12) United States Patent
Tanigaki et al.

(10) Patent No.: US 9,564,664 B2
(45) Date of Patent: Feb. 7, 2017

(54) BATTERY PACK TEMPERATURE CONTROL STRUCTURE FOR ELECTRIC VEHICLES

(71) Applicant: Nissan Motor Co., Ltd., Yokohama-shi, Kanagawa (JP)

(72) Inventors: Tatsunori Tanigaki, Yamato (JP); Kentaro Hatta, Kawasaki (JP); Norihisa Tsujimura, Sagamihara (JP); Makoto Iwasa, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 113 days.

(21) Appl. No.: 14/373,372

(22) PCT Filed: Feb. 7, 2013

(86) PCT No.: PCT/JP2013/052792
§ 371 (c)(1),
(2) Date: Jul. 21, 2014

(87) PCT Pub. No.: WO2013/125354
PCT Pub. Date: Aug. 29, 2013

(65) Prior Publication Data
US 2015/0010782 A1    Jan. 8, 2015

(30) Foreign Application Priority Data
Feb. 20, 2012   (JP) .................. 2012-034128

(51) Int. Cl.
*H01M 10/625* (2014.01)
*H01M 10/6563* (2014.01)
(Continued)

(52) U.S. Cl.
CPC ...... *H01M 10/5016* (2013.01); *B60L 11/1874* (2013.01); *B60L 11/1875* (2013.01);
(Continued)

(58) Field of Classification Search
CPC .............. H01M 10/625; H01M 10/617; H01M 10/6563; H01M 10/42; H01M 10/647
See application file for complete search history.

(56) References Cited

U.S. PATENT DOCUMENTS 6,828,755 B1 * 12/2004 Iverson ................. H01M 16/00
320/104
2008/0050645 A1 * 2/2008 Kai ...................... B60L 11/1861
429/61

FOREIGN PATENT DOCUMENTS

JP         9-104239 A      4/1997
JP      2002-313300 A     10/2002
(Continued)

OTHER PUBLICATIONS

The extended European Search Report for the corresponding European Application No. 13751957.5, issued on Dec. 23, 2014.

*Primary Examiner* — Barbara Gilliam
*Assistant Examiner* — Angela Martin
(74) *Attorney, Agent, or Firm* — Global IP Counselors, LLP

(57) ABSTRACT

A battery pack temperature control structure is provided for an electric vehicle, and basically includes a battery module, a heavy-current disconnecting switch and a temperature control unit. The battery module is mounted in an inner space of the battery pack case. The heavy-current disconnecting switch disconnects, by a manual operation, a battery high-power circuit in the battery module. The temperature control unit is mounted in the inner space of the battery pack case for producing a temperature-controlled air to be blown to the battery module. The heavy-current disconnecting switch is disposed in an upper space position within the inner space of the battery pack case. The temperature control unit is disposed in a space position that is lower than the heavy-current disconnecting switch and that overlaps with (Continued)

the heavy-current disconnecting switch in the vehicle vertical direction.

11 Claims, 7 Drawing Sheets

(51) Int. Cl.
    *H01M 10/647*     (2014.01)
    *H01M 10/617*     (2014.01)
    *H01M 10/6566*     (2014.01)
    *H01M 10/613*     (2014.01)
    *H01M 10/63*     (2014.01)
    *H01M 2/10*     (2006.01)
    *B60L 11/18*     (2006.01)
    *H01M 10/42*     (2006.01)

(52) U.S. Cl.
    CPC ....... *B60L 11/1879* (2013.01); *H01M 2/1077* (2013.01); *H01M 2/1083* (2013.01); *H01M 10/425* (2013.01); *H01M 10/613* (2015.04); *H01M 10/617* (2015.04); *H01M 10/625* (2015.04); *H01M 10/63* (2015.04); *H01M 10/647* (2015.04); *H01M 10/6563* (2015.04); *H01M 10/6566* (2015.04); *H01M 2220/20* (2013.01)

(56) References Cited

FOREIGN PATENT DOCUMENTS

| | | | | |
|---|---|---|---|---|
| JP | 2006-179190 A | 7/2006 | | |
| JP | 2006-240502 A | 9/2006 | | |
| JP | 2008-54379 A | 3/2008 | | |
| JP | 2009-170370 A | 7/2009 | | |
| JP | 2010-153150 | * | 7/2010 | ............ H01M 10/50 |
| JP | 2010-153150 A | 7/2010 | | |
| JP | 2010-231907 A | 10/2010 | | |
| JP | 2011-025790 | * | 2/2011 | ............... B60H 3/06 |
| JP | 2011-25790 A | 2/2011 | | |
| JP | 2011-41357 A | 2/2011 | | |
| JP | 2011-198713 A | 10/2011 | | |

\* cited by examiner

BATTERY PACK TEMPERATURE CONTROL STRUCTURE FOR ELECTRIC VEHICLES

This application is a U.S. National stage application of International Application No. PCT/JP2013/052792, filed Feb. 7, 2013, which claims priority to Japanese Patent Application No. 2012-034128 filed in Japan on Feb. 20, 2012. The entire disclosure of Japanese Patent Application No. 2012-034128 is hereby incorporated herein by reference.

BACKGROUND

Field of the Invention

The present invention relates to a battery pack temperature control structure for an electric vehicle to control the temperature of the battery modules housed in the battery pack case.

Background Information

Conventionally, a battery pack air conditioning or control structure of the battery pack is known in which an air intake duct for introducing an air is provided by extending the front of the battery pack case towards the vehicle front-side and a high-voltage or heavy-current disconnecting switch (S.D. switch) is mounted on the battery pack case on the vehicle-front side (for example, see Japanese Laid Open Patent Application No. H09-104239 A).

SUMMARY

However, in the conventional temperature control structure of the battery pack, since the air intake duct is attached to the battery pack case in a position forward of the heavy-current disconnecting switch on the vehicle front side, a problem occurs that the overall longitudinal dimension of the battery pack case including the intake duct will be increased. Also, when accommodating the temperature control unit, the duct, etc. within the battery pack case, a unit duct should be displaced not to interfere with the heavy-current disconnecting switch, so that a problem arises that the overall longitudinal dimension or overall lateral dimension including the unit duct has to be extended.

The present invention, which has been made in view of the above problems, has an object to provide a battery pack temperature control structure for an electric vehicle in which, while providing the SD switch 4 and the temperature control unit 3 in the inside of the battery pack case 1, an increase in case size in the vehicle longitudinal direction as well as in the vehicle width direction may be suppressed.

In order to achieve the above object, the battery pack temperature control structure for an electric vehicle according to the present invention includes a battery module mounted in an inner space of the battery pack case, a heavy-current disconnecting switch for disconnecting a battery heavy-current or high power circuit of the battery module by a manual operation, and a temperature control unit mounted in the inner space of the battery pack case for producing a temperature conditioned or control air to the battery module as the prerequisite elements. In the battery pack temperature control structure on this prerequisite, the heavy-current disconnecting switch is disposed in the upper space position of the inner space of the battery pack case. Further, the temperature control unit is disposed in a space position lower than the heavy-current disconnecting switch and in a position overlapping with the heavy-current disconnecting switch in the vehicle vertical direction.

Thus, the heavy-current disconnecting switch and the temperature control unit are disposed side by side so as to be overlapping each other in the vertical direction of the vehicle. For example, when arranging the heavy-current disconnecting switch and the temperature control unit in the inner space of the battery pack case, if the temperature control unit would be placed in the vehicle forward of the heavy-current disconnecting switch, the required longitudinal size of the battery pack case would be increased. Further, if the temperature control unit would be placed in the vehicle widthwise position of the heavy-current disconnecting switch, the required vehicle width dimension of the battery pack case is increased. In contrast, when placing the electrical component together with battery module within the battery pack case, by an arrangement in which the heavy-current disconnecting switch and the temperature control unit representing electrical equipment or components are superimposed each other in the vehicle vertical direction, the space efficiency in the case may be enhanced. Consequently, while providing the heavy-current disconnecting switch and the temperature control unit in the inside of the battery pack case, an increase in case size in the vehicle longitudinal direction as well as in the vehicle width direction may be suppressed.

BRIEF DESCRIPTION OF THE DRAWINGS

Referring now to the attached drawings which form a part of this original disclosure.

DETAILED DESCRIPTION OF THE EMBODIMENTS

Figure 1:
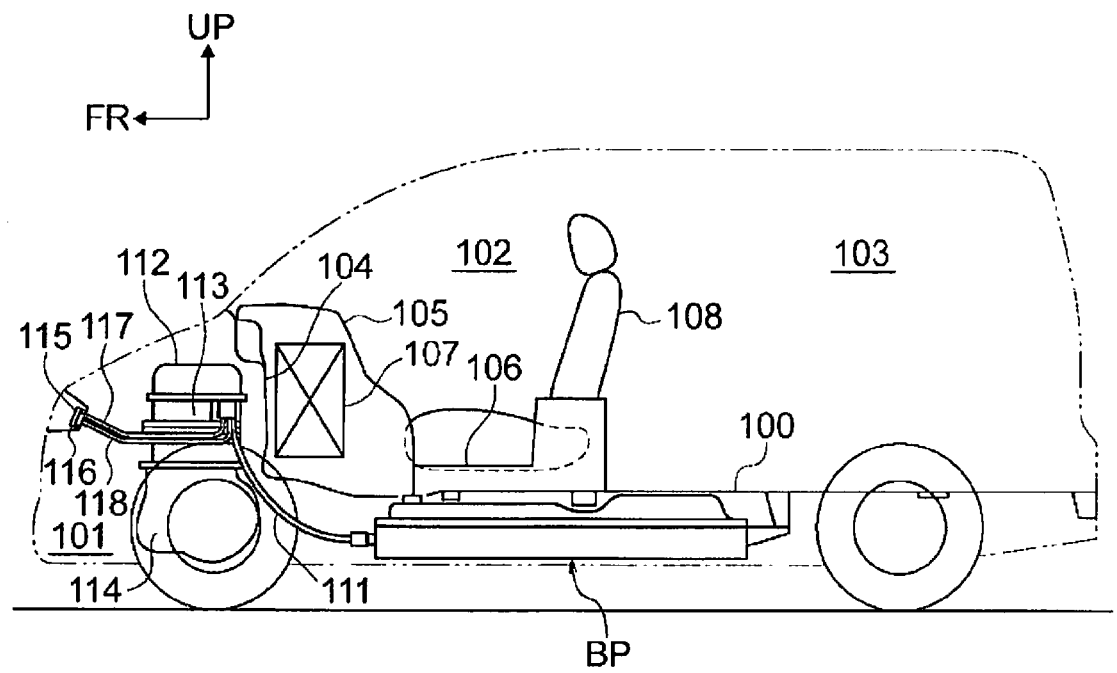
FIG. 1 is a schematic side view illustrating one-box type electric vehicle, on which a battery pack BP that adopts a structure of the first embodiment is mounted.

The best mode for realizing a battery pack temperature control structure for an electric vehicle according to the present invention is now described below with reference to the first embodiment shown in the drawings.

First Embodiment

First, a description will be given of the configuration. The configurations of the battery pack temperature control structure for an electric vehicles in the first embodiment will be separately described in "VEHICLE MOUNTING STRUCTURE OF BATTERY PACK BP", "PACKING COMPONENTS OF BATTERY PACK BP", "REGION-PARTITIONING CONFIGURATION FOR CASE INTERNAL SPACE OF BATTERY PACK BP", "TEMPERATURE CONTROL STRUCTURE OF BATTERY PACK BP", and "RELEVANT STRUCTURE OF TEMPERATURE CONTROL UNIT AND SD SWITCH", respectively.

Vehicle Mounting Structure of Battery Pack BP

Figure 2:
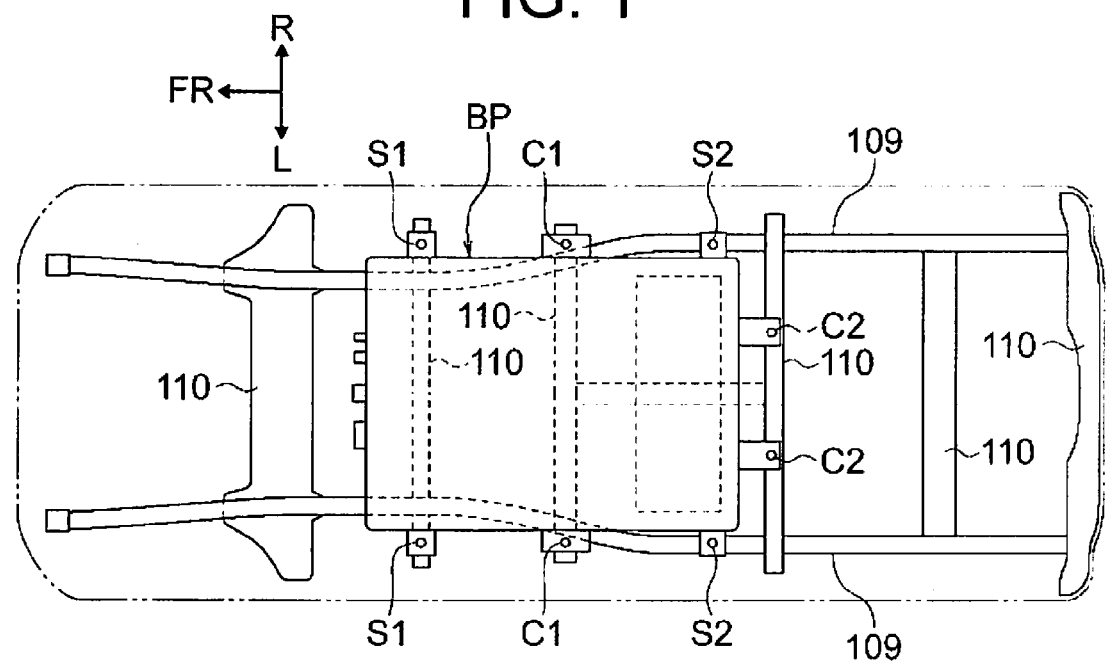
FIG. 2 is a schematic bottom view illustrating the same electric vehicle, on which the battery pack BP that adopts the structure of the first embodiment is mounted.

FIGS. 1 and 2 illustrate a schematic bottom view and a schematic side view respectively showing an electric vehicle of one box type with battery pack BP adopting the structure of the first embodiment. Below, with reference to FIGS. 1 and 2, a description is given of the structure of the vehicle battery pack BP.

As shown in FIG. 1, the battery pack BP is located underside of a vehicle-body floor 100 and arranged at a central position of the wheelbase. The vehicle-body floor 100 is structured to extend from a position connected to a dash panel 104, by which a motor room 101 and a vehicle passenger compartment 102 are defined, to a position of the rear end of the vehicle to which a cargo or luggage room 103 communicative with the vehicle passenger compartment 102 is ensured. The vehicle-body floor is formed into a flat shape across its entire length from the vehicle front to the vehicle rear. The vehicle compartment 102 is provided with an instrument panel 105, a center console box 106, an air-conditioning unit 107 and a vehicle-occupant seat 108.

As shown in FIG. 2, the battery pack BP is supported at eight points with respect to a body member serving as a vehicle-body strengthening member. The body member is constructed by a pair of side members 109, 109 extending in the fore-and-aft direction or longitudinal direction of the vehicle, and a plurality of cross members 110, 110 by which the pair of the side members are connected to each other in the vehicle width direction. Both sides of battery pack BP are supported at six points by a pair of first side member support points S1, S1, a pair of first cross member support points C1, C1, and a pair of second side member support points S2, S2. The rear end of battery pack BP is supported at two points by a pair of second cross member support points C2, C2.

Returning to FIG. 1, the battery pack BP is connected to an heavy-electric module or a high power module 112 (a DC/DC converter+a battery charger) located in the motor room 101 via a charging/discharging harness 111 wired in a straight line along the dash panel 104 in the fore-and-aft direction of the vehicle. In addition to the heavy-electric module 112, an inverter 113 and a motor drive unit 114 (a drive motor for running or propulsion+a reduction gear+a differential gear) are also provided in the motor room 101. A quick-charging port 115 having a charging-port lid and a normal-charging port 116 having a charging-port lid are respectively provided at the front surface position of the vehicle. The quick-charging port 115 and the heavy-electric module 112 are connected to each other via a quick-charging harness 117. The normal-charging port 116 and the heavy-electric module 112 are connected to each other via a normal-charging harness 118.

The battery pack BP is connected to a vehicle air conditioning system with air conditioning unit 107 disposed on the instrument panel 105. In other words, an internal temperature (battery temperature) of the battery pack BP installed with a battery module described below is controlled by a temperature-adjusted air (cold air, warm air). Note that the cold air is produced by introducing into an evaporator refrigerant through a refrigerant pipe branched from the vehicle air conditioning system. The warm air, on the other hand, is created by operating a PTC heater through PTC harness from the in-vehicle air conditioning system.

The battery BP is connected to an external electronic control system via a bi-directional communication line such as a CAN cable (not shown). That is to say, regarding the battery pack BP, a discharging control (power-driving or -running control) and/or a charging control (quick-charging control, normal-charging control, regenerative control, and the like) of the battery is carried out by an integrated or unified control based on the information exchange with the external electronic control system.

Pack Components of the Battery Pack BP

Figure 3:
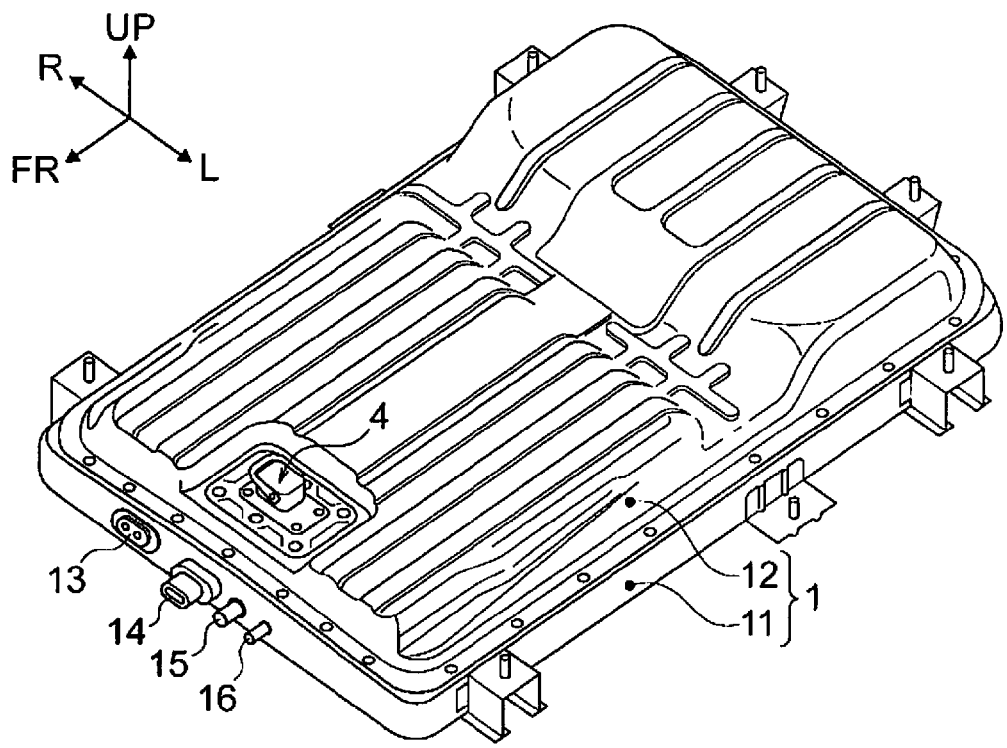
FIG. 3 is a whole perspective view illustrating the battery pack BP of the first embodiment.
Figure 4:
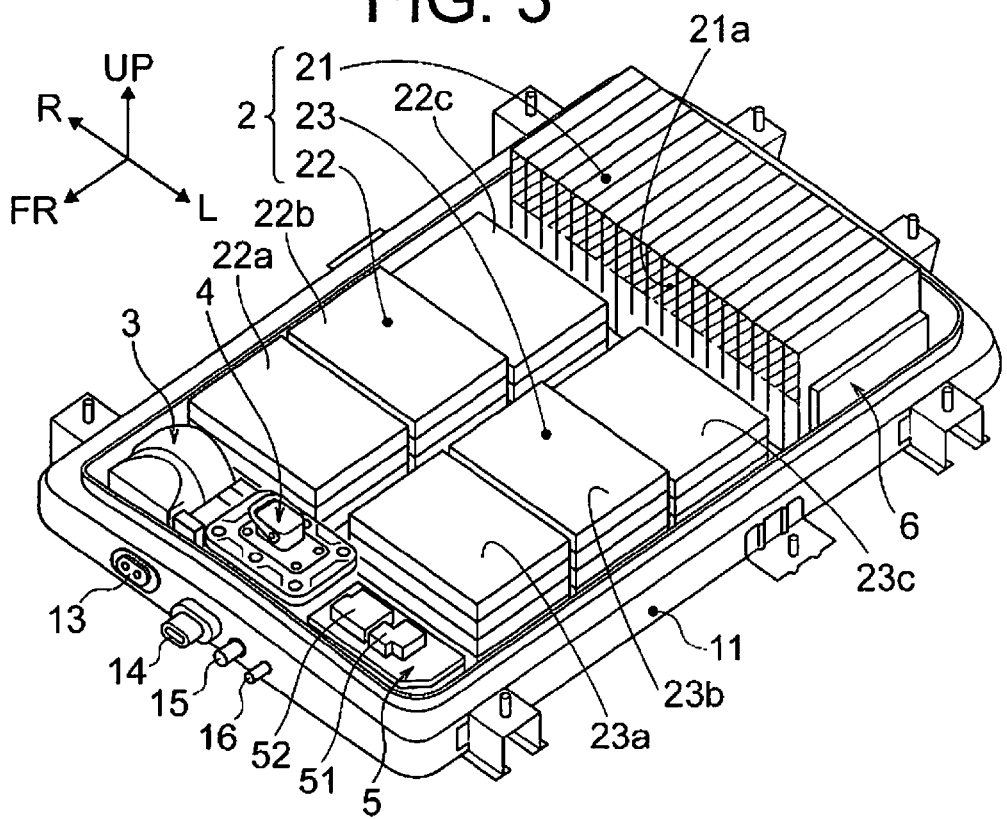
FIG. 4 is a perspective view illustrating the battery pack BP of the first embodiment in a state where a battery-case upper cover is removed.

FIGS. 3 and 4 are diagrams showing details of the battery pack BP in the first embodiment. Below with reference to FIGS. 3 and 4, a description is given of the pack constituting components of the battery pack BP.

As shown in FIGS. 3 and 4, the battery BP in the first embodiment is provided with a battery pack case 1, a battery module 2, a temperature control unit 3, a service disconnect switch 4 (high voltage isolation switch: hereinafter, referred to as "SD switch"), a junction box 5, and a Li-Ion battery controller 6 (hereinafter referred to as "LB Controller").

As shown in FIGS. 3 and 4, the battery pack case 1 is composed of two components, i.e., a battery pack lower frame 11 and a battery pack upper cover 12.

As shown in FIG. 4, the battery pack lower frame 11 is a frame member fixedly supported to the vehicle body member. This battery pack lower frame 11 has a mounting space formed by a square recess for mounting the battery module 2 and other pack components 3, 4, 5, 6. A refrigerant pipe connector terminal 13, a charging/discharging connector terminal 14, a heavy-electric connector terminal 15 (for passenger compartment air-conditioning), and a weak electric connector terminal 16 are attached to the frame front edge of the battery pack lower frame 11.

As shown in FIG. 3, the battery pack upper cover 12 is a cover member bolted onto the outer periphery of the battery pack lower frame 11. The battery pack upper cover 12 in particular has a concavo-convex stepped cover contour surface in conformity with the concavo-convex height shapes of the pack components 2, 3, 4, 5, and 6 mounted on the battery pack lower frame 11.

As shown in FIG. 4, the battery module 20 is mounted on the battery pack lower frame 11 and the battery module 2 is constituted by three divided modules, i.e., a first battery module 21, a second battery module 22, and a third battery module 23. Each battery module 21, 22, and 23 is an assembly structure in which a plurality of battery cells of secondary battery (a lithium ion battery, etc.) are stacked on one another. The detailed configuration of each battery module 21, 22, and 23 is described below.

As shown in FIG. 4, the battery module No. 1, 21 (first battery module) is mounted in a vehicle rear region of the battery pack lower frame 11. As the battery module No. 1, 21, a rectangular shaped battery cell of a thin thickness is prepared, and a plurality of the cells are stacked in the thickness direction. Then, the module is constituted by vertically stacking or piling up the battery cells in the same direction as the vehicle width direction (such as 20 cells stacked vertically).

The battery module No. 2, 22 (second battery module) and the battery module No. 3, 23 (second battery module) are configured as a pair of modules, which are separately installed on the left and the right along the vehicle width direction in the vehicle central region forward of the first battery module 21. The battery module No. 2, 22 and the battery module No. 3, 23 are of a flat-stacked configuration of the exactly same pattern. More specifically, a battery cell of rectangular shape of thin thickness is prepared as a constituting unit, and a plurality (such as 4 or five) of these battery cells are stacked in the thickness direction and a plurality of sets of the stacked battery cells (for example, one set of four pieces of stacked battery cells and two sets of five pieces of stacked cells) are prepared. These sets of stacked battery cells are prepared in a flat-stacked state in which the staking direction of the battery cells and the vehicle vertical direction are the same. Finally, the second battery module is configured by placing a plurality of these flat-stacked cells in the vehicle longitudinal direction, for example, by arranging the four flat-stacked cells, the five flat-stacked cells, and the five stacked-cells in the order in the direction from the vehicle rear to the vehicle front. As shown in FIG. 4, the battery module No. 2, 22 has front-side battery module portions 22a, 22b and rear-side battery module portions 22c which is lower than the front-side battery module portion 22a, 22b by a single cell. The battery module No. 3, 23 has, as shown in FIG. 4, front-side battery module portions 23a, 23b and rear-side battery module portions 23c which is lower than the front-side battery module portion 23a, 23b by a single cell.

As shown in FIG. 4, the temperature control unit 3 is disposed in the right side area of the vehicle front space of the battery pack lower frame 11, and a temperature controlled air (cold air, hot air) is blown into an air duct 9 of the battery pack BP as described below. Note that the refrigerant is introduced in the evaporator 33 through a refrigerant pipe connector terminal or inlet 13 attached to the frame front edge.

As shown in FIGS. 3 and 4, an SD switch 4 is located in a central region of the vehicle forward space of the battery lower frame 11 for mechanically cut off the battery heavy-electric circuit through a manual operation. The battery heavy-electric circuit or power circuit is configured by connecting each battery module 21, 22, and 23 containing an internal bus-bar, a junction box 5, and the SD switch 4 each other through bus-bar. When inspecting, repairing, and replacing components such as the heavy-electric module 112, the inverter 113, and the like, the switching between OFF and OFF states of the SD switch 4 can be changed by a manual operation.

As shown in FIGS. 3 and 4, the junction box 5 is arranged in the left side area of the vehicle front space of the battery pack lower frame 11 to perform a centralized supply/shutoff/distribution of high voltage by a relay circuit. This junction box 5 is also provided with a temperature control relay 51 and a temperature controller 52 for controlling the temperature control unit 3. The junction box 5 is connected to an external heavy-electric module 112 via a charge and discharge connector terminal 14 and a charge and discharge harness 111. The junction box 5 is connected to an external electronic control system via the weak electric harness.

As shown in FIG. 4, the LB controller 6 is disposed on the left side end surface position of the battery module No. 1, 21 to perform a capacity management, a temperature management, and a voltage management of each battery module 21, 22, 23. This LB controller 6 acquires battery capacity information, battery temperature information, and battery voltage information through arithmetic processing based on a temperature detection signal of a temperature detection signal line, a battery voltage detection value from the battery voltage signal detection line, and a battery current detection signal of the battery current detection signal line. Further, the LB controller 6 is connected to the external electronic control system through the weak electric harness transmitting an ON/OFF signal of the relay circuit, battery capacity information, battery temperature information, and the like.

Region-Partitioning Configuration for Case Inner Space of Battery BP

Figure 5:
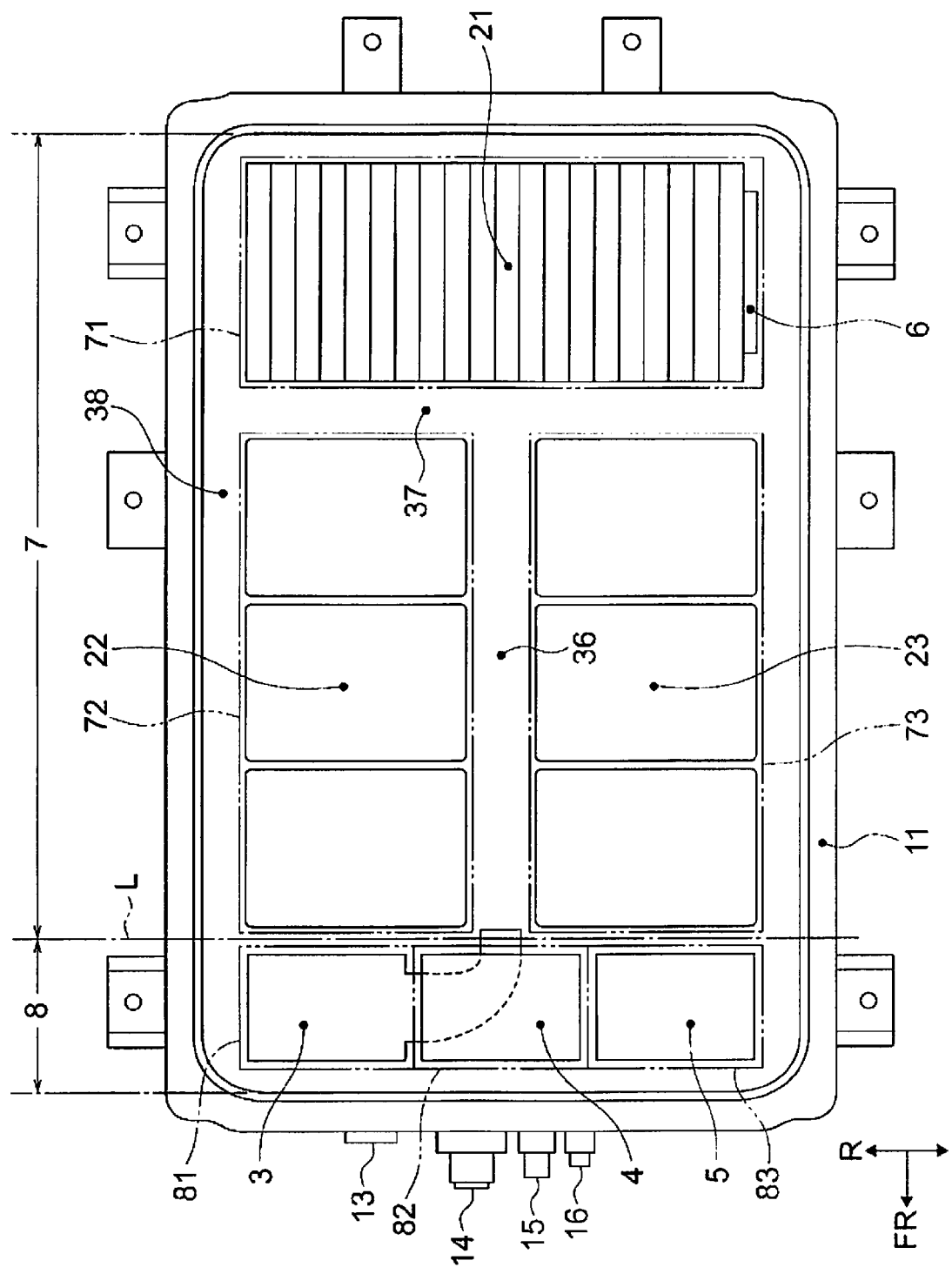
FIG. 5 is a plan view illustrating the region-partitioning configuration of the case internal space of the battery pack BP of the first embodiment.

FIG. 5 is a plan view illustrating a region-partitioning configuration of the case internal space of the battery pack BP in the first embodiment. The region-partitioning configuration for the case inner space of battery BP is now described with reference to FIG. 5.

As shown in FIG. 5, in the battery pack BP in the first embodiment, the inner space of the battery pack case 1 is partitioned or divided by a boundary line L drawn across the vehicle width direction into two regions in the vehicle longitudinal direction, i.e., a battery module accommodating or mounting region 7 on the vehicle rear side and an electrical equipment or component accommodating or mounting region 8 on the vehicle front side. The battery module mounting region 7 occupies the most region extending between the vehicle rear-end and the boundary line L forward of the vehicle. The electrical equipment mounting region 8 occupies a region extending between a vehicle frontend and the boundary line L on the vehicle front side, narrower than the battery module mounting region 7.

The battery module mounting area 7 is divided into three split rectangular regions, namely, a first split rectangular region 71, a second split rectangular region 72, and a third split rectangular region 73 by a T-shaped passage (formed by a central passage 36 and an intersecting passage 37). The battery module No. 1, 21, which has the LB controller 6 attached to one side surface thereof, is mounted in the first split rectangular region 71. The module No. 2, 22 is mounted in the second split rectangular region 72. The battery module No. 3, 23 is mounted in the third split rectangular region 73.

The electrical equipment mounting region 8 is divided into three regions, i.e., a first partitioning region 81, a second portioning region, and a third partitioning region 83. The temperature control unit 3 is mounted in a region extending between the first partitioning regions 81 and the lower part of the second portioning region. The SD switch 50 is mounted on the upper part of the second partitioning region 82. The junction box 5 is mounted in the third partitioning region 83.

In the inner space of the battery pack BP, a space for arranging the air duct 9 (see FIGS. 6, 8 to 11) is secured and, for an internal circulation of conditioned air, a temperature control air passage is formed using the gap created by mounting each battery module 21, 22, and 23 in the respective partitioning region. The temperature control air passage includes a central passage 36 in the vehicle longitudinal direction (second passage), a cross passage 27 (first passage) in the vehicle width direction crossing the central passage 36, and a recirculation passage 38 for returning the introduced temperature controlled air back to the temperature control unit 38. The central unit 36 is formed by leaving a gap between the opposing surfaces of the battery module No. 2, 22 and the battery module No. 3, 23. The cross passage 37 is formed by leaving a gap between opposing surfaces of the battery module No. 1, 21 and battery modules No. 2, and No. 3. The recirculation passage 38 is formed by giving a clearance allowance or gap between the battery pack lower frame 11 and each pack constituting component 2, 3, 4, 5, and 6. Note that, as the temperature control, other than the central passage 38, the cross passage 37, and the recirculation passage 38, such a gap or clearance are also included, which are formed by mounting in the case inner space the pack constituting components 2, 3, 4, 5, and 6.

Temperature Control Structure of Battery Pack BP

FIGS. 6 to 12 are diagrams showing the details of the temperature control structure that is installed in the battery pack BP of Example 1. Below, based on FIGS. 6 to 12, the temperature control structure of the battery pack BP is now described.

Figure 6:
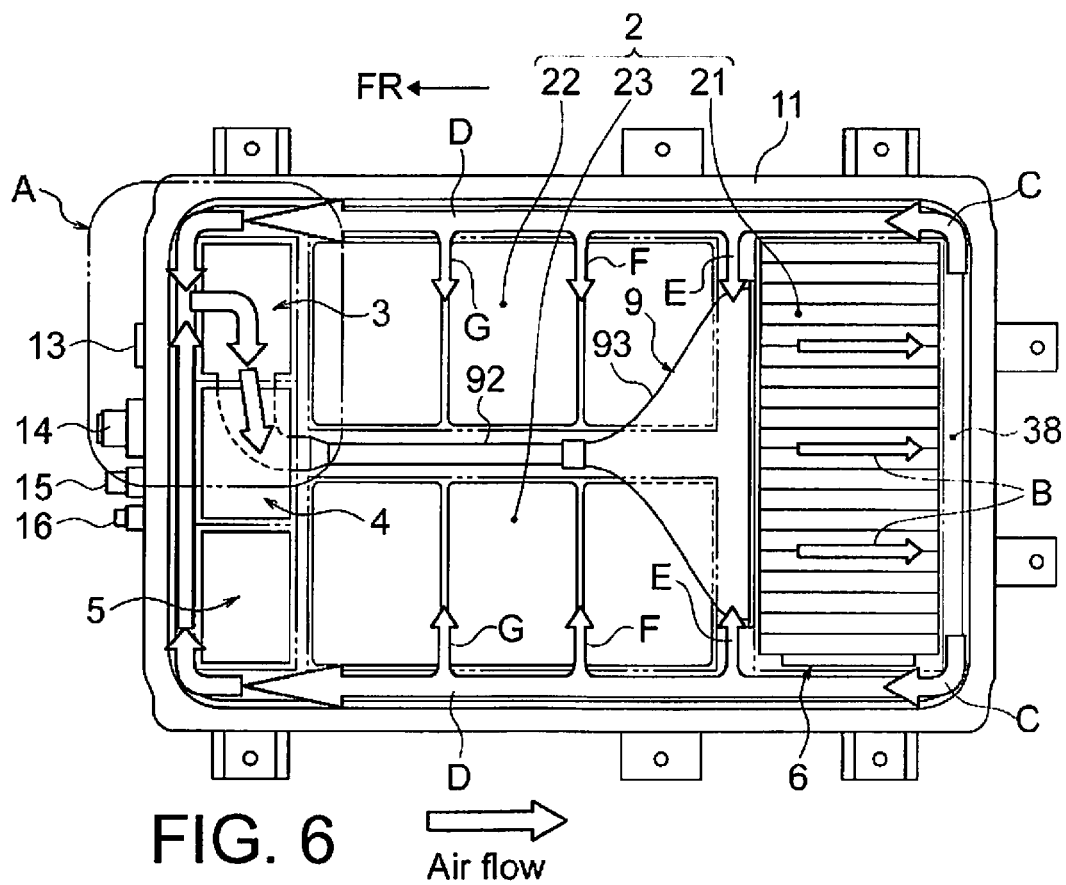
FIG. 6 is a plan view illustrating the internal structure of the battery pack BP of the first embodiment and the flow of temperature control or adjusting air in a state where the battery-case upper cover is removed.

As shown in FIG. 6, the temperature control structure of the battery pack BP has a battery module No. 1, 21 (first battery module), battery modules No. 2, No. 3, 22, 23 (second module), a temperature control unit 3, and an air duct 9.

The battery module No. 1, 21 is accommodated in the vehicle rearward region in the internal space of the battery pack case 1.

The battery modules Nos. 2 and 3, 22 and 23, are disposed in the inner space of the battery pack case 1 and arranged in the region forward of the battery module No. 1, 21 and the height of the module is dimensioned lower than the battery module No. 1, 21.

Figure 7:
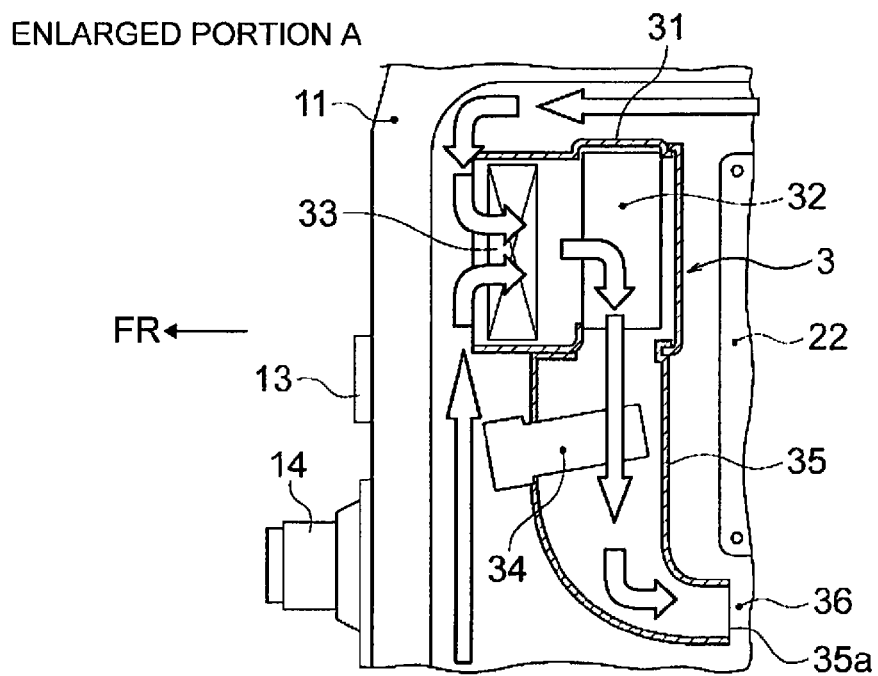
FIG. 7 is an enlarged view of the section A of FIG. 6, showing the configuration of a temperature control unit of the battery pack BP of the first embodiment and the flow of the temperature controlled air.

As shown in FIG. 7, the temperature control unit 3 is configured to have a unit casing 31, a blowing fan 32, an evaporator 33, a PTC heater 34, and a duct unit 35. The duct unit 35 is provided with an air blowing port 35a for blowing temperature controlled air to the battery module No. 1, 21, and the battery modules Nos. 2, and 3, 22, 23.

Figure 8:
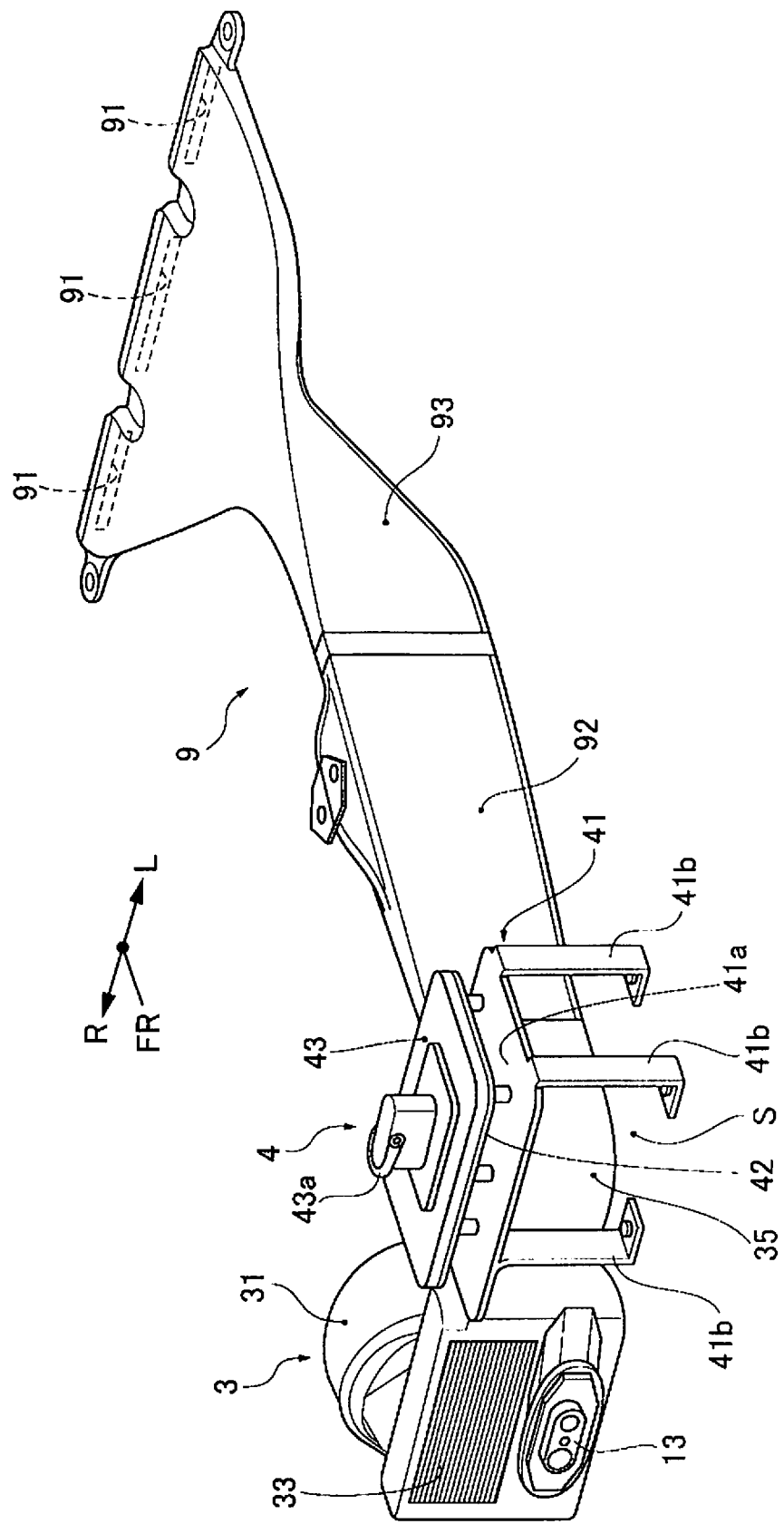
FIG. 8 is a perspective view showing a SD switch, a temperature control unit, and an air duct mounted in the battery pack BP in the first embodiment.
Figure 11:
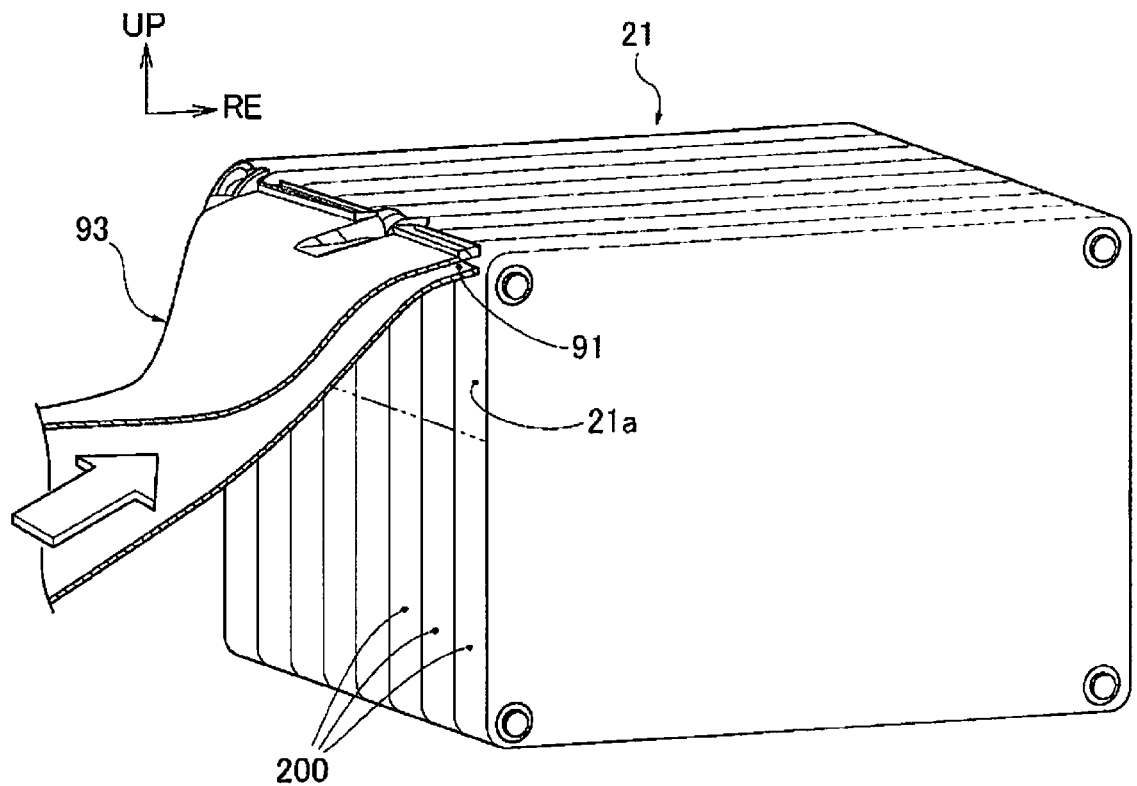
FIG. 11 is a perspective view illustrating the relationship between the first battery module mounted in the battery pack BP and the blowing opening of the blowing air duct in the first embodiment.

As shown in FIG. 6, the blower duct 9 is connected at its one end with the air blowing port 35a and at the other end disposed opposite to a module front upper region 21a (see FIG. 4) of the battery module No. 1 that protrudes in the vehicle upper direction above the top surface of the battery modules Nos. 2 and 3, 22 and 23, as shown in FIGS. 8 and 11, a blowout opening 91 is formed that extends along the module front upper region 21a and blows out the temperature controlled air to the vehicle rear (back surface of the module).

Figure 9:
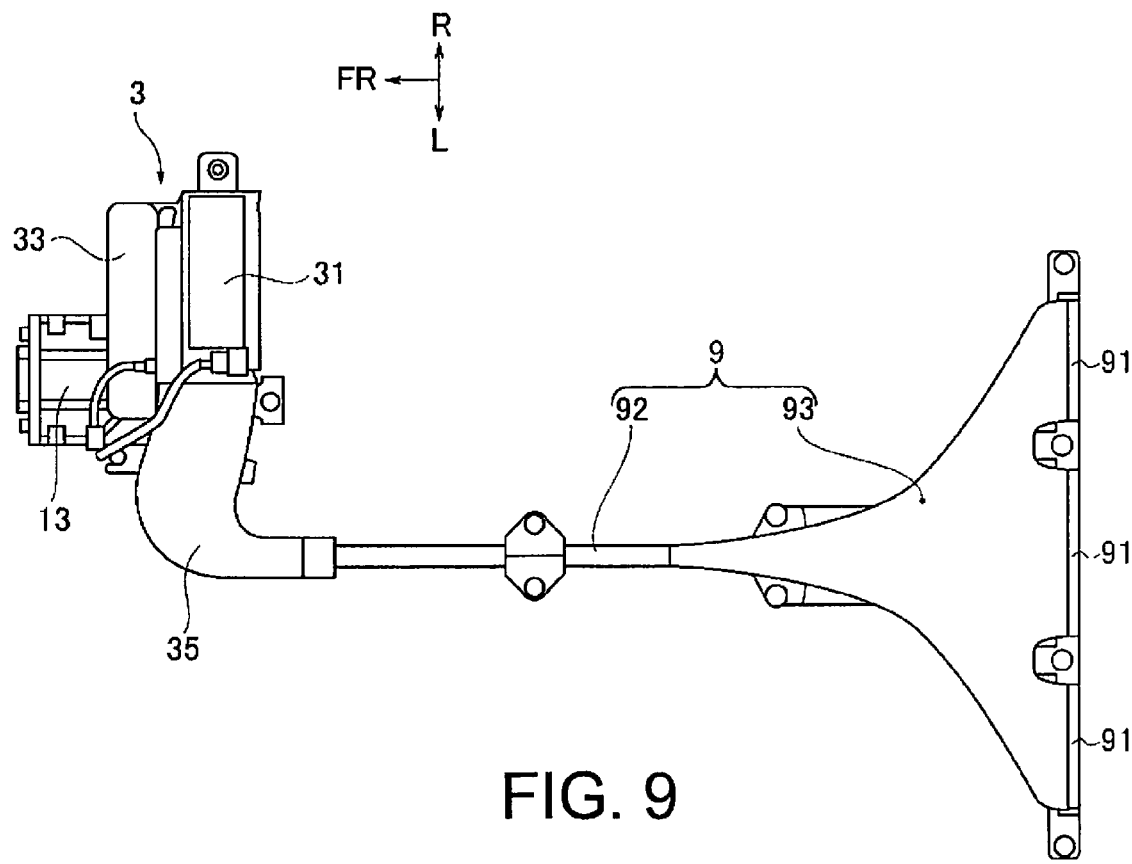
FIG. 9 is a plan view illustrating a temperature control unit and a blowing air duct mounted in the battery pack of the first embodiment.
Figure 10:
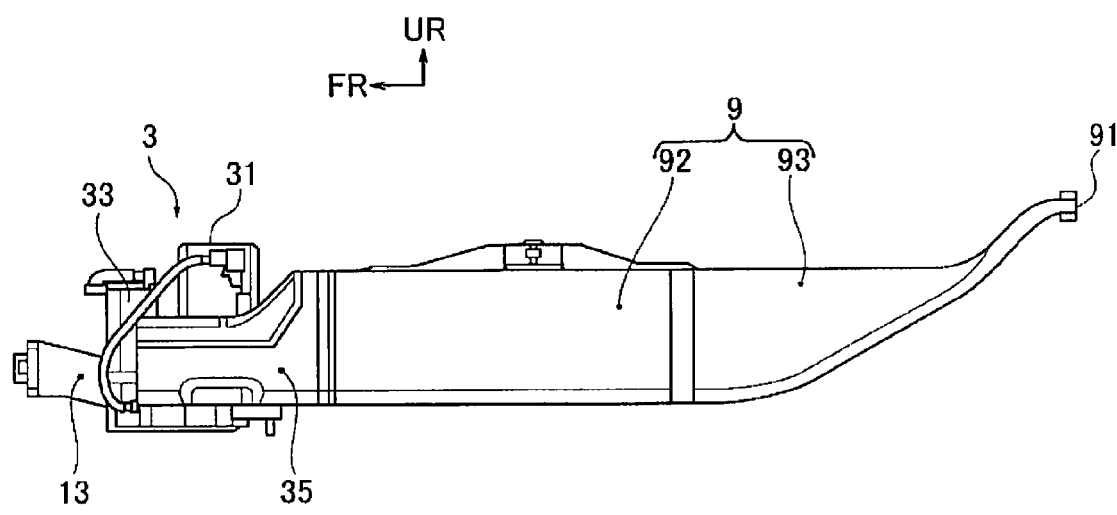
FIG. 10 is a side view illustrating a temperature control unit and a blowing air duct mounted in the battery pack of the first embodiment.

As shown in FIG. 6, the blower duct 9 is located on the T-shaped clearance space area due to the cross passage 37 and central passage 36 intersecting each other and formed through the partitioning mount of each battery module 21, 22 and 23. As shown in FIGS. 8 to 10, the blower duct 9 is connected to the air blowing port 35a of the unit duct 35 and is provided with an equal-width duct portion 92 extending in the vehicle longitudinal direction with an equal-width dimension in the vehicle width direction and a broadened width duct portion 93 with the dimension in the vehicle width direction gradually increased towards the blowout opening 91.

Figure 12:
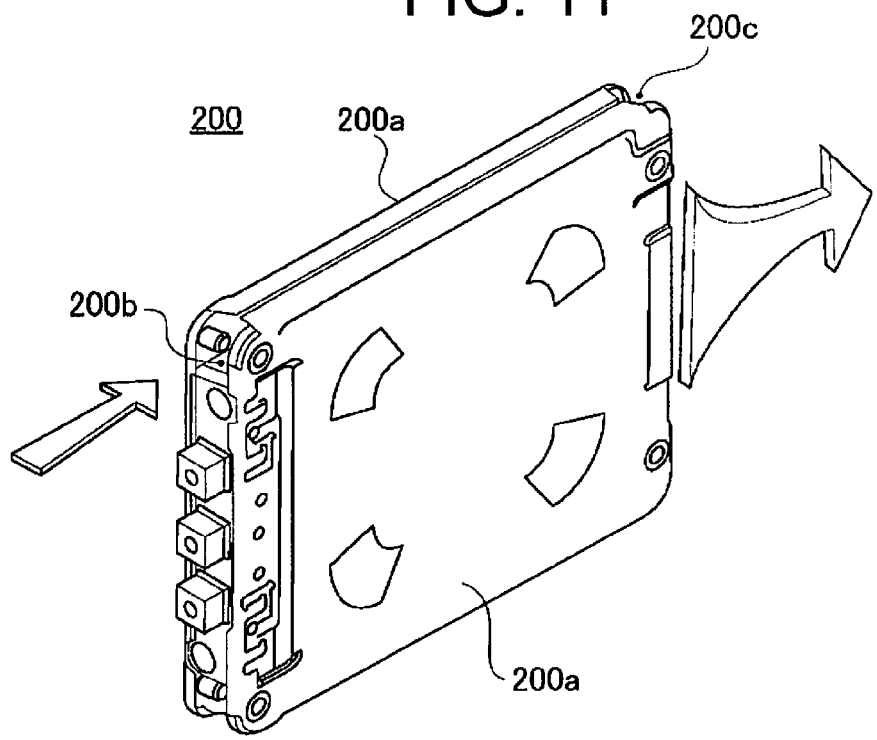
FIG. 12 is a perspective view illustrating battery cells constituting the first battery module mounted in the battery pack BP.

The blowout opening 91 a slit-like opening of the third divided into three parts so as to blow out the temperature control or conditioned air in a wide range of the vehicle width direction along the module front upper surface 21a. Further, each battery cell 200 of the battery module No. 1, 21 that receives the temperature controlled air from the blowout opening 91 is configured, as shown in FIG. 12, by being held by a cell holder 200a, 200a from outside, which is vertically partitioned into two pieces and mounted to each other by caulking. The cell holder 200a, 200a has an air intake opening 200b for introducing the temperature controlled air from the blowout opening 91 towards the vehicle rear between the cell holders 200a, 200a and an air discharge opening 200c for discharging the introduced temperature controlled air. Note that, with respect to each battery cell of the battery modules Nos. 2 and 3, 22, 23, the similar structure is adopted to ensure the smooth internal circulation flow of the temperature controlled air.

The equal-width duct portion 92 is shaped similar to the cross section (rectangular shape) of the central passage 36 so as to assume a duct sectional shape of the longitudinally long or elongation cross section and is arranged along the central passage 36 formed by the front side battery module portions 22a, 22b, 23a, 23b (battery module No. 1) of higher height out of the battery modules Nos. 2 and 3, 22, 23.

As shown in FIG. 8, the widening width duct portion 93 is shaped such that the height of the duct cross section is gradually decreased (FIG. 10) in the direction of the blowout opening 91 while the width of the duct cross section is gradually widened (FIG. 9) toward the blowout opening 91. Further, out of the batter modules Nos. 2 and 3, 22, 23, the widening width duct portion 93 is arranged along the upper space of the rear-side battery module portions 22c, 23c of lower height (battery module No. 2) and the cross passage 37.

Related Configuration of SD Switch and Temperature Control Unit of Battery Pack BP FIG. 8 is a perspective view showing the SC switch, a temperature control unit, and an air duct mounted on the battery pack BP in the first embodiment. Below, with reference to FIG. 8, the related configuration between the temperature control unit 3 and the SD switch of the battery pack BP.

Inside the battery pack BP, as shown in FIG. 8, a temperature control unit 3, a SD switch 4, an air duct 9, and a switch fixing frame 41 are provided.

With respect to the temperature control unit 3 and the SD switch 4, the SD switch 4 is disposed in the upper space of the inner space of the battery pack case 1. Further, the temperature control unit 3 is arranged in the lower position relative to the SD switch 4 and in a position overlapping with the SD switch 4 in the vehicle vertical direction.

With respect to the temperature control unit 3, a unit case housing a blower fan 32 therein is placed in one end position of the electrical component mounting region 8 and a unit duct connected to the unit case 31 is disposed in the lower center of the electrical equipment mounting region 8.

The SD switch 4 has a switch body 42 having therein a switch contact that selectively connects or disconnects the battery power circuits by a lever operation, and a manual operation unit 43 having a lever 43a pivotal about an axis in the vehicle longitudinal direction from a switch-on state to vertically upward position for removal thereof to transfer to a switch-off state. The switch body 42 is disposed at the top center position of the electrical component mounting region 7, and the manual operation unit 43 connected to the switch body 42 is disposed so as to be exposed to the outside of the battery pack case 1.

The switch fixing frame 41 is fixed within the inside of the battery pack case 1 and is provided with a plate portion 41a, a leg portion 41b which extends downwardly from the plate portion 41a and is fixed to the inside of the battery pack case 1 (battery pack lower frame 11). Further, on the top position of the plate portion 41a of the switch fixing frame 41, the switch body 42 of the SD switch 4 is provided. On the other hand, a unit 35 that is bent at right angles in an arc shape is disposed in a space under the switch S, which is formed around the leg portion 41b of the switch fixing frame 41. The air blowing port 35a of this unit duct 35 is connected to the blowing duct 9.

Now, the operations of the battery pack temperature control structure of the electric vehicle in the first embodiment is separately described by dividing in "CHARGING AND DISCHARGING OPERATION OF BATTERY PACK BP", "BATTERY TEMPERATURE CONDITIONING OPERATION OF BATTERY PACK BP", and "ARRANGING OPERATION BETWEEN TEMPERATURE CONTROL UNIT AND SD SWITCH".

Charging and Discharging Operation of Batter Pack BP

The battery pack BP mounted with a secondary battery of lithium-ion battery etc. corresponds to a fuel tank for an engine driven vehicle and a charging operation to increase the battery capacity and discharging operation to reduce the battery capacity are repeated. Below, the charging and discharging operations of the battery pack BP are described.

When performing a quick-charging with the vehicle stopped at a quick-charging stand, a charging-port lid located in the front end of the vehicle is opened first. Then, a quick-charging connector on the charging stand side is inserted into the quick-charging port 115 on the vehicle side. During the quick-charging operation, a direct-current quick-charging voltage is supplied to the DC/DC converter of heavy-electric module 112 through the quick-charging harness 117, and then converted into a direct-current charging voltage by voltage-conversion of the DC/DC converter. The direct-current charging voltage is supplied via the charging/discharging harness 111 to the battery pack BP, and thus supplied to the battery cells of each of the battery modules Nos. 1 to 3, 21, 22, and 23 via the junction box 5 and the bus bars in the battery BP, for charging.

When performing a normal-charging with the vehicle parked at home, the charging-port lid located in the front end of the vehicle is opened first. Then, a normal-charging connector of the home power-supply side is inserted into the normal-charging port 116 on the vehicle side. During the normal-charging operation, an alternating-current normal-charging voltage is supplied to the charger of heavy-electric module 112 through the normal-charging harness 118, and then converted into a direct-current charging voltage by voltage-conversion and AC/DC conversion of the charger. The direct-current charging voltage is supplied via the charging/discharging harness 111 to the battery pack BP, and thus supplied to the battery cells of each of the battery modules Nos. 1 to 3, 21, 22, and 23 via the junction box 5 and the bus bars in the battery pack BP for charging.

During a power driving or running mode at which the vehicle is running by a driving force produced by the drive motor, a direct-current battery voltage from each of the battery modules 21, 22, and 23 is discharged from the battery pack BP via the bus bars and the junction box 5. The discharged direct-current battery voltage is supplied to the DC/DC converter of heavy-electric module 112 via the charging/discharging harness 111, and then converted into a direct-current driving voltage by voltage-conversion of the DC/DC converter. The direct-current driving voltage is converted into an alternating-current driving voltage by DC/AC conversion of inverter 113. The alternating-current driving voltage is applied to the drive motor of motor drive unit 114 so as to rotate the drive motor.

With the drive motor put in regenerative operation during which the drive motor serves as a generator in the presence of a decelerating requirement, the drive motor carries out a power-generation function, for converting a rotational energy inputted from tires of drive road wheels into a generated energy. An alternating-current generated voltage, produced by the generated energy, is converted into a direct-current generated voltage by AC/DC conversion of inverter 113, and then converted into a direct-current charging voltage by voltage-conversion of the DC/DC converter of heavy-electric module 112. The direct-current charging voltage is supplied to the battery pack BP via the charging/discharging harness 111, and thus supplied to the battery cells of each of battery modules No. 1 to 3, 21, 22, and 23 via the junction box 5 and the bus bars in the battery pack BP for charging.

Battery Temperature Conditioning Operation of Battery Pack BP

The battery is highly temperature dependent so that the battery performance is reduced with the battery temperature too excessive or too low. Thus, in order to, in order to maintain high battery performance as possible, it is necessary for the battery temperature housed in a battery pack BP to be adjusted or conditioned to the optimum temperature range. Below, with reference to FIGS. 5 and 6, and FIGS. 11 to 12, description is given of the battery temperature conditioning operation reflecting the situation described above.

First, a temperature conditioning operation, performed by the temperature-conditioning controller 52 is discussed. For example, when the internal temperature of battery pack BP exceeds a first set temperature due to continuous battery charging/discharging loads and/or high outside air temperatures, refrigerant is introduced into the evaporator 33 of temperature control unit 3, and the blower fan 32 is rotated. Thus, heat is removed from the air passing through the evaporator 33 and thus cold air is created. By circulation of the cold air in the case internal space, in which the battery module No. 1, 21, the battery module No. 2, 22, and the battery model No. 3, 23 are mounted, the internal temperature (=battery temperature) in the battery pack BP can be reduced.

In contrast, when the internal temperature of battery pack BP becomes less than a second predetermined temperature due to cold-air circulation and/or low outside air temperatures, the PTC heater of the temperature-conditioning unit is energized, and the blower fan is rotated. Thus, heat is added to the air passing through the PTC heater and thus hot air is created. By circulation of the warm air in the case internal space, in which the battery module No. 1, 21, the battery module No. 2, 22, ant the battery model No. 3, 23 are mounted, the internal temperature (=battery temperature) of the battery pack BP may be increased.

Thus, by performing the temperature control of the battery pack BP, it is possible for the internal temperature of the battery pack BP to maintain within the range between the first predetermined temperature and the second predetermined temperature. At this time, it is critical to circulate the temperature controlled air while discharging so that the temperature distribution of the battery module No. 3, 23 and the battery module No. 2, 22 and the battery module No. 1, 21 will be uniform. Below, a description of the battery temperature operation by the temperature controlled air.

The temperature-adjusted air (cool air, warm air) blown out from the air blowing port 35a of the temperature control unit 3 flows toward the rear of the vehicle from the front of the vehicle through the air duct 9. Then, from the blowout opening 91 of the air duct 9, as shown by arrow B in FIG. 6, the temperature-adjusted air is blown out in a wide range of vehicle width direction along the module front upper region 21a of the battery module No. 1, 21. Thus, heat exchange takes place between the temperature-adjusted air blown out from the blowout opening 91 of the air duct 9 and the battery module No. 1, 21.

Then, as indicated by arrows C, C in FIG. 6, the temperature-adjusted air that has exchanged heat with the battery module No. 1, 21 is bifurcated into both sides of the vehicle width direction and flows into the recirculation passage 38. As indicated by arrows D, D in FIG. 6, the temperature-adjusted air that has flowed in the recirculation passage 38 flows through the vehicle side passages toward the front of the vehicle from the rear of the vehicle, respectively. Of the temperature-adjusted air toward the vehicle front from the rear of the vehicle, as indicated by arrows E, E and G in FIG. 6, a part of the temperature conditioned air flows towards the central passage 36 through the cross passage 37 and a clearance between the battery module No. 2, 22 and the battery module No. 3, 23 to merge into the central passage 36. Therefore, a heat exchange takes place between the temperature-adjusted air flowing towards the central passage 36 and the battery modules No. 2, 3.

The temperature control or adjusted air flows, having exchanged heat with the battery module No. 1, 21, through the vehicle side passage of the recirculation passage 38 toward the front of the vehicle from the rear of the vehicle will be returned to the intake side of the temperature control unit 3 via the vehicle front passage of the recirculation passage 38. In addition, the temperature adjusted air that merges into the central passage 38 and flows from the vehicle rear to the vehicle front will be merged, after having heat exchanged with the battery modules Nos. 2 and 3, 22, 23, at the vehicle front side passage and returned to the intake side of the temperature control unit 3. Therefore, when the temperature controlled air is returned to the intake side of the temperature control unit 3, the returned temperature controlled air is introduced in the temperature control unit 3 for producing cool air or warm air again and the temperature control process will be repeated.

As described above, in the first embodiment, one end of an air duct 9 is connected to the air blowing port 35a of the temperature control unit 3 and the other end of the air duct 9 is disposed opposite the module front upper region 21a of the battery module No. 1, 21 that protrudes in the vehicle upper direction above the top surface of the battery modules Nos. 2, 3, 22, 23. Further, at the other end position of the air duct 9, a blowout opening 91 is formed so as to extend in the vehicle width direction along the module front upper region 21a and to blow the temperature controlled air towards the rear of the vehicle.

By the above-described configuration, the temperature control or conditioned air from the temperature control unit 3 is blown out of the blowout opening 91 of the air duct 9 via the air duct 9 from the air blowing port 35a with respect to the module front upper region 21a toward the rear of the vehicle.

For example, during travel or running of the vehicle, when monitoring the battery module which temperature has increased, with respect to the cooling effect by the running wind, cooling of the front side of the vehicle battery module is large whereas cooling of the rear side of the vehicle battery module is small. Therefore, when observing the temperature distribution of the battery module in the case, such a temperature distribution is shown in which the temperature of the vehicle rear side battery module is higher than the vehicle front side battery module. When the cooling air is blown out to the vehicle front side battery module in this temperature distribution condition, cooling air will be delayed to reach the vehicle rear side battery module so that the vehicle rear side battery module remains at high temperature. Thus, the temperature distribution state with a great temperature drop will be maintained for a long period of time.

In contrast, when blowing cooling air to the battery module No. 1 first, a cooling operation will be such that the temperature of the battery module No. 1, 21 will be reduced with good response, and subsequently the battery modules Nos. 2, 3, 22, 23 will be cooled. Thus, the temperature drop across the battery module No. 1 and the battery modules Nos. 2, and 3, 22, and 23 will be restrained in a short time so that the temperature equalization among each of the battery models 21, 22, and 23 will be achieved effectively.

Further, it is noted that a step is generated from the difference in height between the battery module No. 1, 21 and the battery modules Nos. 2 and 3, 22, and 23, all these three being arranged in the vehicle longitudinal direction. By taking advantage of this step, the blowout opening 91 of the air duct 9 is disposed opposite to the module front upper region 21a of the battery module No. 1, 21. Thus, it is not required for the height of the air duct 9 to provide at the position higher than the maximum height of the battery module No. 1, 21. Therefore, the maximum height dimension of the battery pack case 1 will not be restricted by the height of the air duct 9. In other words, despite the air duct 9 extending up to the battery module No. 1, 21, the maximum height of the battery pack case may be determined with the height dimension of the battery module No. 1 as a reference, i.e., without considering the height of the air duct 9.

As a result, while achieving a uniform temperature of each battery module 21, 22, 23 housed in the battery pack case 1, the maximum height of the battery pack case 1 may be kept low. That is, it is possible to meet the requirements of compactness and high temperature adjusting performance requirements that are required to the battery pack BP to be disposed in a limited space available in the floor bottom.

In the first embodiment, the air blowing port 35a of the temperature control unit 3 is disposed towards the central passage 36 in the electrical equipment mounting region 8. Further, such a configuration is adopted in which the air or ventilation duct in a T-shaped clearance space formed the central passage 36 and the cross passage 37 crossing each other, which are created by partitioning mounting of each of the battery modules 21, 22, 23. Thus, the temperature control unit 3 is disposed in a previously provided, electrical equipment mounting region 8 and the air duct 9 is placed by taking advantage of a T-shaped clearance space formed by the central passage 36 and the cross passage 37 crossing each other, which are created by partitioning mounting of each of the battery modules 21, 22, 23. Therefore, while the battery module 2, the temperature control unit 3, and the air duct 9 are disposed to be housed in the battery pack case 1, the size of the battery pack BP may be made compact so that a compact battery pack BP may be achieved.

In the first embodiment, the air duct 9 is configured to be formed by an equal-width duct portion 92 with a constant size in the vehicle width direction and extending in the vehicle longitudinal direction connected to the air blowing port 35a of the temperature control unit 3, and a width widening duct portion 93 connected to the equal-width duct and that expands the size vehicle width direction gradually towards the blowout opening 91. Further, such a configuration is adopted in which the equal-width duct portion 92 is disposed along the central passage 36 and the width widening duct portion 93 is disposed in the upper space of the rear-side battery module portion 22c, 23c and in the cross passage 37. Thus, the equal-width duct portion 92 of the air duct 9 is disposed by using the central passage 36 while the width widening duct portion 93 is disposed using the upper space of the rear-side battery module portion 22c, 23c and in the cross passage 37. Therefore, using a clearance space formed in the internal space of the battery pack BP, the air duct forming the blowout opening 91 extending in the vehicle width direction along the module front upper region 21a may be arranged with a good space utility.

In the first embodiment, the equal-width duct portion 92 is shaped to have a vertically elongated cross-section similar to the shape of the cross section the central passage 36. Further, such a configuration is adopted for the width widening duct portion 93 in which the height of the duct cross-section is made to be gradually reduced toward the blowout opening 91 the balloon, and, at the same time, the width of the duct cross-section is made to be gradually expanded towards the blowout opening 91. For example, when converting the vertically elongated flow of the temperature controlled air into a horizontally elongated flow to allow to pass through the interior of the air duct, if the sectional area of the passage changes greatly in the converting region, a turbulent flow would occur so that the velocity distribution of the temperature controlled air blowing out from the blowout opening of the air duct varies greatly. By contrast, by suppressing the change in the passage cross section in the region of flow conversion from a vertically elongated flow into the horizontally elongated flow, the temperature controlled air with the uniformed velocity distribution will be blown out from the blowout opening 91 of the air duct 9.

In the first embodiment, the battery module No. 1, 21 is constituted by mounting through vertically stacking of each batter cell 200. Further, such a configuration is adopted in which both an air inlet opening 200b and the air outlet opening 200b for discharging the introduced air are provided to the cell holder 200a, 200a, which holds the outside of each batter cell. With this configuration, the temperature controlled air toward the rear of the vehicle from the blowout opening 91 of the air duct 9 is guided in the cell holder 200a, 200a through the inlet opening 200b so that the temperature controlled air flows directly around each battery cell 200 to remove the heat from the battery cell 200 or apply heat to each battery cell efficiently. Therefore, through the temperature controlled air from the blowout opening 91 of the air duct 9 together with increase in the heat exchange efficiency with the battery module No. 1, 21, the battery temperature adjusting effect is further improved.

Arrangement Operation of Temperature Control Unit and SD Switch

As described above, in the case in which a temperature control unit and a SD switch are housed in a battery pack BP, since the battery pack BP is disposed in a restrained space on the floor lower position, it is required that the temperature control unit and the SD switch are disposed with a high space utility. Below, a description is given of the arrangement operation of the SD switch and the temperature control unit reflecting this requirement.

In the first embodiment, the SC switch 4 is disposed in the upper space position of the inner space of the battery pack case 1. Further, such a configuration is adopted in which the temperature control unit 3 is disposed in a space position lower than the SD switch 4 and in a position overlapping with the SD switch 4 in the vehicle vertical direction.

For example, when arranging the SD switch and the temperature control unit in the inner space of the battery pack case, if the temperature control unit would be placed in the vehicle forward of the SD switch, the required longitudinal size of the battery pack case would be increased. Further, if the temperature control unit would be placed in the vehicle widthwise position of the SD switch, the required vehicle width dimension of the battery pack case is increased.

In contrast, when placing the electrical component together with battery modules, 21, 22, 23 within the battery pack case 1, by an arrangement in which the SD switch and the temperature control unit 3 representing electrical equipment or components are superimposed each other in the vehicle vertical direction, the space efficiency in the case may be enhanced.

Consequently, while providing the SD switch 4 and the temperature control unit 3 in the inside of the battery pack case 1, an increase in case size in the vehicle longitudinal direction as well as in the vehicle width direction may be suppressed. That is, it is possible to meet the requirements of compact battery pack BP disposed in the limited space of the floor bottom.

In the first embodiment, a switch fixing frame 41 that has a plate portion 41a and a leg portion 41b extending downward from the plate portion 41a and fixed to the battery pack case 1 is provided. Further, the SD switch 4 is provided on the top surface position of the plate portion 41a and the temperature control unit 3 is disposed in the downward position of the SD switch 4 and in a downward space S of the switch formed around the leg portion 41b. That is, by the switch fixing frame 41, the location of the SD switch 4 and the location of the temperature control unit 4 are separated from each other in the vertical direction. Therefore, by employing a vertical separation spaced apart by the switch fixing frame 41 between the temperature control unit 3 and the SD switch 4, even if the vibration is input to the battery pack BP, the interference between the SD switch 4 and the temperature control unit 3 will be prevented.

In the first embodiment, such a configuration is adopted in which the temperature control unit 3 is provided with a unit case 31 accommodating a blower or ventilation fan 32, and a unit duct 35 with a blowout port 35a opened towards the battery modules 21, 22, 23. Further, the unit case 31 is disposed in the widthwise or lateral position of the SD switch 4, and the unit duct 35 is disposed in the position lower than the SD switch 4. For example, in the case of the temperature control unit 3, in order to determine the blowing direction to the battery modules 21, 22, 23, the unit duct 35 is connected to the unit case 31. However, since the unit duct 35 is shaped to be bent to conform to the blowing direction to the batter modules 21, 22, and 23 so that upsizing is inevitable. In contrast, the unit duct 35 of the temperature control unit 3 which is configured to direct the blowing direction to the battery modules 21, 22, 23 is arranged and superimposed with the SD switch 4 in the vertical direction of the vehicle.

In the first embodiment, the inner space of the battery pack case 1 is separated into a battery module mounting region 7 in the vehicle rear side and an electrical equipment mounting region 8 in the vehicle front side separated from each other by a boundary line L drawn in the vehicle width direction. Further, the battery module 2 is disposed in the battery module mounting region 7 while the SD switch 4 and the temperature control unit 3 are disposed in the electric equipment mounting region 8. With this configuration, the battery module 2 is disposed in the batter module mounting region 7 and both the SD switch 4 and the temperature control unit 3 are disposed in a previously divided, electrical equipment mounting region 8. Example 1, and across the boundary line L drawn in the vehicle width direction, the inner space of the battery pack case 1, and were divided into the electrical component mounting region 8 on the front side of the vehicle and the battery module mounting area 7 on the vehicle rear side. Then, such a configuration is adopted in which the battery module 2 is mounted in the battery module mounting region 7 while the SD switch 4 and the temperature control unit 3 are disposed in the electrical component mounting region 8. With this arrangement, the battery module 2 is disposed in the battery module mounting region 7, the temperature control unit 3 and the SD switch 4 is disposed on the electrical component mounting region 8, which is in advance separately. Therefore, a compact battery pack BP incorporating the battery module 2, the SD switch 4, and the temperature control unit 3 is obtained.

Now, the technical effect will be described. In a battery pack temperature control structure of an electric vehicle in the first embodiment, it is possible to obtain the following effects.

(1) A battery pack temperature control structure for an electric vehicle provided with: a battery module 2 mounted in an inner space of the battery pack case 1, a heavy-current disconnecting switch (SD switch 4) for disconnecting a battery heavy-current or high power circuit of the battery module 2 by a manual operation, and a temperature control unit 3 mounted in the inner space of the battery pack case 1 for producing a temperature conditioned or controlled air to the battery module, wherein the heavy-current disconnecting switch (SD switch 4) is disposed in the upper space position of the inner space of the battery pack case 1, and the temperature control unit 3 is disposed in a space position lower than the heavy-current disconnecting switch (SD switch 4) and in a position overlapping with the heavy-current disconnecting switch (SD switch 4) in the vehicle vertical direction. Therefore, while providing the heavy-current disconnecting switch and the temperature control unit in the inside of the battery packs case, an increase in case size in the vehicle longitudinal direction as well as in the vehicle width direction may be suppressed.

(2) Within the battery pack case 1, a switch fixing frame 41 that has a plate portion 41*a* and a leg portion 41*b* extending downward from the plate portion 41*a* and fixed to the battery pack case 1 is provided. Further, the SD switch 4 is provided on the top surface position of the plate portion 41*a*, and the temperature control unit 3 is disposed in the downward position of the SD switch 4 and in a switch downward space S formed around the leg portion 41*b*. That is, in addition to the effect of (1), by employing a vertical separation between the heavy-current disconnecting switch (SD switch 4) and the temperature control unit 3 by the switch fixing frame 41, even if the vibration is input to the battery pack BP, the interference between the SD switch 4 and the temperature control unit 3 may be prevented.

(3) The temperature control unit 3 is provided with a unit case 31 accommodating a blower or ventilation fan 32, and a unit duct 35 connected to the unit case 31 and having a blowout port 35*a* opened towards the battery module 2. Further, the unit case 31 is disposed in the widthwise or lateral position of the heavy-current disconnecting switch (SD switch 4), and the unit duct 35 is disposed in the position lower than the heavy-current disconnecting switch (SD switch 4). Thus, in addition to the effect of (1) or (2), the unit duct 35 of the temperature control unit 3 which is configured to direct the blowing direction to the battery modules 2 is arranged and superimposed with the heavy-current disconnecting switch (SD switch 4) in the vertical direction of the vehicle.

(4) The inner space of the battery pack case 1 is partitioned or divided by a boundary line L into a battery module accommodating region 7 on one side thereof and an electrical equipment mounting region 8 on the other side. The battery module 2 is mounted in the battery module mounting region 7 while the heavy-current disconnecting switch (SD switch 4) and the temperature control unit 3 are disposed in the electrical equipment mounting region 8. Thus, in addition to the effects of (1) to (3), a compact battery pack BP may be achieved, which accommodates the battery module 2, the heavy-current disconnecting switch (SD switch 4), and the temperature control unit 3.

Although the battery pack temperature control structure for an electric vehicle has been described based on the first embodiment, the specific configuration is not limited to the first embodiment. Rather, without departing from the spirit of the invention pertaining to each claim set forth in CLAIMS, design changes or additions may be allowable.

In the first embodiment, an example is shown in which the temperature control unit 3 produces both the cooling air and hot air. However, as the temperature control unit, an example of the unit capable of producing cooling air only is alternative. Further, an example of the unit capable of producing hot air only may be conceivable. Furthermore, the unit may be configured to reduce the battery temperature by forced ventilation from a fan.

In the first embodiment, an example is shown in which the SD switch 4 is provided or disposed in a front-side intermediate position. However, as long as operable from inside a passenger compartment, an arbitrary position on the battery pack is acceptable.

In the first embodiment, an example is shown in which the switch fixing frame 4 is provided within the battery pack case 1, and both the SD switch 4 and the temperature control unit 3 are disposed with respect to this switch fixing frame 41. However, without providing the switch fixing frame, the SD switch may be arranged and fixed to the battery pack case and the temperature control unit may be disposed below the SD switch. Further, the SD switch may be provided on the top surface of the temperature unit case.

In the first embodiment, an example is shown in which the unit case 31 for the temperature control unit 3 is disposed on the side-position of the SD switch 4 while the unit duct 35 is disposed below the SD switch 4. However, such an example is also acceptable in which the entire temperature control unit is disposed in a position below the SD switch. In other words, it is sufficient for at least a part of the temperature control unit is vertically arranged in a cascaded manner with respect to the SD switch.

In the first embodiment, an example is shown in which the inner space of the battery pack case 1 is divided into the battery module mounting region 7 and the electrical equipment mounting region 8. Further, the battery module 2 is disposed in the battery module mounting region 7 while both the SD switch 4 and the temperature control unit 3 are disposed in the electrical equipment mounting region 8. However, without portioning the inner space of the battery pack case into regions, the structure of accommodating the SD switch and the temperature control unit is also applicable.

In the first embodiment, an example is shown in which the battery pack temperature control structure according to the present invention is applied to an electric vehicle of the one-box type equipped with only a propulsion or traction motor as a driving source. However, as a matter of course, the battery pack temperature control structure for an electric vehicle according to the present invention may also be applicable, in addition to the one box type electric vehicle, to various electric vehicles such as sedan, wagon and SUV types of vehicles. Further, the present invention is applicable to an electric vehicle of hybrid type (hybrid electric vehicle) that is mounted with both a driving motor and an engine as the propulsion or driving source. In sum, the present invention may be applicable to an electrically driven vehicle in which a battery pack is installed or mounted in the floor bottom, luggage compartment, etc.

The invention claimed is:

1. A battery pack temperature control structure for an electric vehicle, the battery pack temperature control structure comprising:
    a battery module mounted in an inner space of a battery pack case, the battery pack case including an upper cover disposed vertically above the battery module;
    a heavy-current disconnecting switch for disconnecting a battery heavy-current of the battery module by a manual operation, the heavy-current disconnecting switch including a manual operation unit arranged to be exposed on an outside of the upper cover; and
    a temperature control unit mounted in the inner space of the battery pack case underneath the upper cover, the temperature control unit including a unit case accommodating a blower fan and a unit duct connected to the unit case in the inner space of the battery pack case to supply a temperature controlled air to the battery module.

2. The battery pack temperature control structure as claimed in claim 1, wherein
    a switch fixing frame is disposed within the battery pack case, the switch fixing frame having a plate portion and a leg portion extending downward from the plate portion the leg portion being fixed to the battery pack case,
    the heavy-current disconnecting switch is provided on a top surface position of the plate portion, and
    the temperature control unit is disposed in a downward position with respect to the heavy-current disconnecting switch in a downward space formed around the leg portion.

3. The battery pack temperature control structure as claimed in claim 1, wherein the unit duct has a blowout port opened towards the battery module, the unit case is disposed in a lateral position with respect to the heavy-current disconnecting switch and the unit duct is disposed in the position lower than the heavy-current disconnecting switch.

4. A battery pack temperature control structure for an electric vehicle, the battery pack temperature control structure comprising:
    a battery module mounted in an inner space of a battery pack case, the battery pack case including an upper cover disposed vertically above the battery module;
    a heavy-current disconnecting switch for disconnecting a battery heavy-current of the battery module by a manual operation, the heavy-current disconnecting switch including a manual operation unit arranged to be exposed on an outside of the upper cover; and
    a temperature control unit disposed entirely within the inner space of the battery pack case underneath the upper cover, the temperature control unit being configured to supply a temperature controlled air to the battery module,
    the inner space of the battery pack case being divided by a boundary line into a battery module accommodating region on one side thereof and a separate electrical equipment mounting region on the other thereof when viewed in the vehicle vertical direction, and
    the battery module being mounted in the battery module mounting region while the heavy-current disconnecting switch and the temperature control unit are disposed laterally adjacent each other in the electrical equipment mounting region.

5. The battery pack temperature control structure as claimed in claim 2, wherein
    the unit duct has a blowout port opened towards the battery module, the unit case is disposed in a lateral position with respect to the heavy-current disconnecting switch and the unit duct is disposed in the position lower than the heavy-current disconnecting switch.

6. The battery pack temperature control structure as claimed in claim 5, wherein
    the inner space of the battery pack case is divided by a boundary line into a battery module accommodating region on one side thereof and an electrical equipment mounting region on the other thereof, and
    the battery module is mounted in the battery module mounting region while the heavy-current disconnecting switch and the temperature control unit are disposed in the electrical equipment mounting region.

7. The battery pack temperature control structure as claimed in claim 2, wherein
    the inner space of the battery pack case is divided by a boundary line into a battery module accommodating region on one side thereof and an electrical equipment mounting region on the other thereof, and
    the battery module is mounted in the battery module mounting region while the heavy-current disconnecting switch and the temperature control unit are disposed in the electrical equipment mounting region.

8. The battery pack temperature control structure as claimed in claim 3, wherein
    the inner space of the battery pack case is divided by a boundary line into a battery module accommodating region on one side thereof and an electrical equipment mounting region on the other thereof, and
    the battery module is mounted in the battery module mounting region while the heavy-current disconnecting switch and the temperature control unit are disposed in the electrical equipment mounting region.

9. The battery pack temperature control structure as claimed in claim 1, wherein
the unit duct being arranged to pass underneath the heavy-current disconnecting switch.

10. The battery pack temperature control structure as claimed in claim 4, wherein
the temperature control unit includes a unit duct for supplying the temperature controlled air to the battery module, the unit duct being arranged to pass underneath the heavy-current disconnecting switch.

11. The battery pack temperature control structure as claimed in claim 4, wherein
the temperature control unit includes a blower fan disposed laterally adjacent the heavy-current disconnecting switch.

* * * * *